(12) United States Patent
Hoshino et al.

(10) Patent No.: US 8,991,214 B2
(45) Date of Patent: Mar. 31, 2015

(54) METHOD OF REFURBISHING A QUARTZ GLASS COMPONENT

(75) Inventors: Katsutoshi Hoshino, Yamagata (JP);
Masahide Kato, Yamagata (JP);
Yasuhiro Umetsu, Yamagata (JP);
Kosuke Imafuku, Nirasaki (JP)

(73) Assignees: Techno Quartz Inc., Tokyo (JP); Tokyo Electron Limited, Tokyo (JP)

( * ) Notice: Subject to any disclaimer, the term of this patent is extended or adjusted under 35 U.S.C. 154(b) by 391 days.

(21) Appl. No.: 12/846,537

(22) Filed: Jul. 29, 2010

(65) Prior Publication Data
US 2011/0023543 A1 Feb. 3, 2011

(30) Foreign Application Priority Data
Jul. 30, 2009 (JP) ................................. 2009-178318

(51) Int. Cl.
*C03B 23/20* (2006.01)
*C03B 29/02* (2006.01)

(52) U.S. Cl.
CPC .................. *C03B 23/20* (2013.01); *C03B 29/02* (2013.01)
USPC ............................................................. 65/28

(58) Field of Classification Search
CPC ................................ C03B 29/02; C03B 23/20
USPC ............... 65/28, 36, 42, 43, 56, 29.18, 30.11, 65/29.12, 47, 61, 65, 252, 284, 111, 120; 250/461.1
See application file for complete search history.

(56) References Cited

U.S. PATENT DOCUMENTS

| | | | | |
|---|---|---|---|---|
| 2,259,400 | A | * | 10/1941 | Switzer .......................... 250/302 |
| 3,501,340 | A | * | 3/1970 | Burton ........................... 427/230 |
| 3,702,519 | A | * | 11/1972 | Rice et al. ........................ 451/29 |
| 3,829,690 | A | * | 8/1974 | Snyder ........................... 250/302 |

(Continued)

FOREIGN PATENT DOCUMENTS

| | | |
|---|---|---|
| JP | 2004-137109 | 5/2004 |
| JP | 2005-067997 | 3/2005 |

(Continued)

OTHER PUBLICATIONS

JP 4139184 (Machine Translation) [online], [retrieved on Sep. 21, 2012], retrieved from PAJ Database (http://www19.ipdl.inpit.go.jp/PA1/cgi-bin/PA1Index).*

(Continued)

*Primary Examiner* — Richard Crispino
*Assistant Examiner* — Yana B Krinker
(74) *Attorney, Agent, or Firm* — Jordan and Hamburg LLP

(57) ABSTRACT

A method is provided of refurbishing a quartz glass component which has been contaminated and eroded due to continuous use in a plasma process apparatus for semiconductor manufacturing. In the method, a surface deposit on the quartz glass component is removed by an appropriate cleaning method which is determined depending on the contamination status, and presence or absence of residual deposit on the cleaned component is carefully inspected through irradiating with light of a predetermined wavelength to cause fluorescence effect. Then the eroded portion of the quartz glass component is restored to the original state by flame treatment and precision machining. As a result, the refurbishment method can increase the mechanical strength of the quartz glass component, enhance the productivity and yield ratio through efficient use of the remaining materials of the quartz glass.

20 Claims, 12 Drawing Sheets

(56) References Cited

U.S. PATENT DOCUMENTS

| | | | | |
|---|---|---|---|---|
| 5,836,809 A | * | 11/1998 | Kosic | 451/89 |
| 2006/0213077 A1 | * | 9/2006 | Tanaka et al. | 34/423 |
| 2008/0216513 A1 | * | 9/2008 | Sato et al. | 65/28 |

FOREIGN PATENT DOCUMENTS

| | | | | | |
|---|---|---|---|---|---|
| JP | 2005067997 A | * | 3/2005 | | C03B 32/00 |
| JP | 2006-232624 | | 9/2006 | | |
| JP | 2006-306675 | | 11/2006 | | |
| JP | 2006-309158 | | 11/2006 | | |
| JP | 4139184 | | 6/2008 | | |
| JP | 4139184 | * | 8/2008 | | C03B 32/00 |

OTHER PUBLICATIONS

JP 2005067997 (Machine Translation) [online], [retrieved on Sep. 21, 2012], retrieved from PAJ Database (http://www19.ipdl.inpit.go.jp/PA1/cgi-bin/PA1Index).*

* cited by examiner

Refurbishment Steps of Quartz Glass Component

To-be-refurbished Quartz Glass Component
Fig. 3(a)

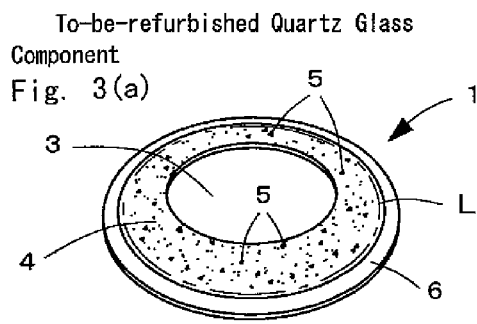

Cutting Eroded Portion, Using Non-eroded Portion (Outer Ring)
Fig. 3(b)

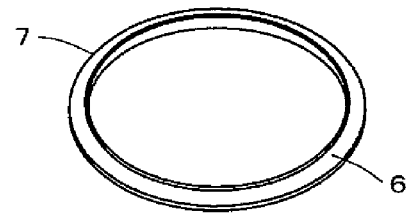

New Inner Ring (Remaining material of Quartz glass)
Fig. 3(c)

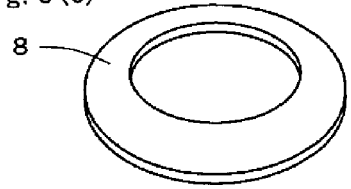

Cutting Outer Ring into Four Parts
Fig. 3(d)

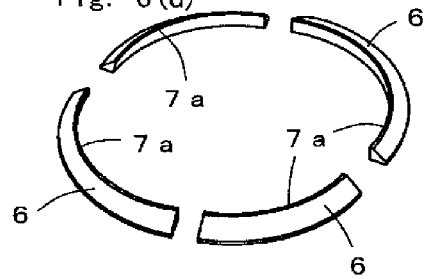

Cutting New Inner Ring into Four Parts
Fig. 3(e)

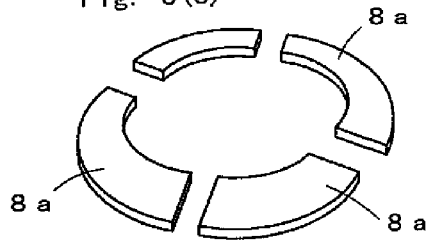

Chamfering Corners of Welding Portion
Fig. 3(f)

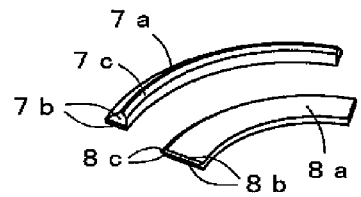

Welding of Inner Ring and Outer Ring (One Pair)
Fig. 3(g)

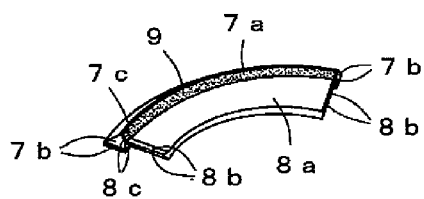

Welding Four Pairs of Inner Rings and Outer Rings, Completion of Refurbished Prototype Ring
Fig. 3(h)

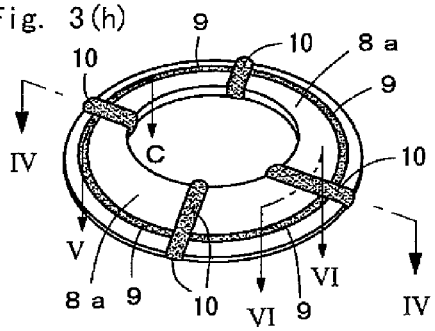

Refurbishment Steps of Quartz Glass Component

To-be-refurbished Quartz Glass Component

Cutting To-be-refurbished Quartz Glass component into Four Parts

Chamfering Corners of Welding Portion (Four Pairs)

Thickening of Eroded Portion by Flame Welding (Four Pairs)

Welding of Rings (Four Pairs), Completion of Refurbished Prototype Ring

Refurbishment Steps of Quartz Glass Component
To-be-refurbished Quartz Glass Component
Fig. 13(a)
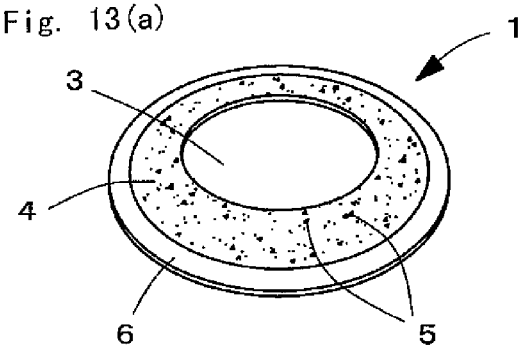
Thickening of Eroded Portion by Flame Welding
Fig. 13(b)
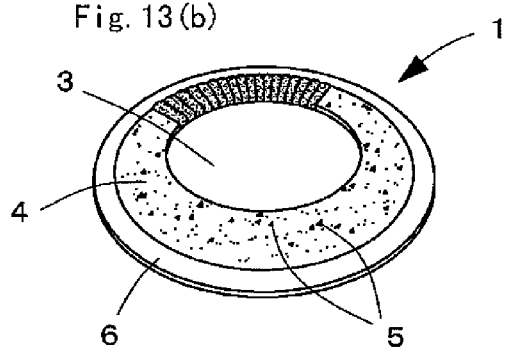
After Thickening, Completion of Refurbished Prototype Ring
Fig. (13c)
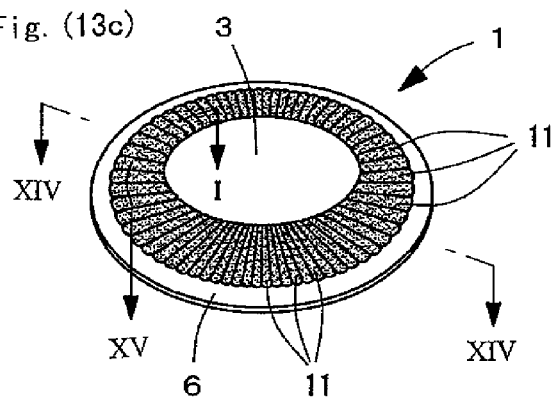

XVII(b)    XVII(b)

METHOD OF REFURBISHING A QUARTZ GLASS COMPONENT

BACKGROUND OF THE INVENTION

The present invention relates to a method of refurbishing a quartz glass component, in which the state of an attachment film of by-products (hereinafter called the "deposit"), erosion and deterioration of a quartz glass component that has been spent by using in a certain process of semiconductor manufacturing, for example, is carefully checked before cleaning the quartz glass component, an appropriate cleaning method is determined depending on the contamination status, the quartz glass component is cleaned with minimum damage to a base material, the residual deposit is precisely checked to thereby carefully select the quartz glass component and carry out refurbishment rationally. As a result, the refurbishment method can increase the mechanical strength of the quartz glass component which is made of brittle material, prevent breakage arising from growth of thermal stress and strain during a flame treatment in a refurbishment process, enhance the productivity and the yield ratio through efficient use of quartz glass materials, stabilize the quality and rationalize the refurbishment.

In a plasma processing apparatus for manufacturing a semiconductor or liquid-crystal device, the surface of the quartz glass component is eroded and deteriorated by continuous use in a plasma environment that contains fluorine or chlorine-based gas. Even though the quartz glass component is regularly discarded after the predetermined amount of erosion, it is so expensive that improvement of the situation has been desired.

Due to such demand, various methods have been proposed to remove and refurbish the eroded and deteriorated portion of the quartz glass component.

For example, there has been proposed a method in which the deposit on the surface of the quartz glass component, which is to be refurbished, consists of organic matter containing fluorine and is removed by using a chemical such as dilute hydrofluoric acid or by a grinding process. After removal of the deposit, a reaction surface, which has been eroded and deteriorated in the plasma environment, and its opposite surface are thickened through welding quartz rods with an oxygen-hydrogen flame burner. Then, after grinding thickened sides into the predetermined thickness, both surfaces are finished to an original state by precision machining and cleaning. (For example, see patent document 1.)

Another refurbishing method of the quartz glass component also has been proposed. The quartz glass component with a step design on the surface, which is to be refurbished, having the reaction surface by plasma is cut near the periphery thereof, and the plate-like portion including the eroded area is separated from the outer portion with no erosion. Then, the plate-like portion with the erosion area is discarded, and is renewed with a new material that has almost the same shape as the original. The new one is welded to the separated outer portion for refurbishment. (For example, see patent document 2.)

Further, another refurbishing method of the quartz glass component has been proposed. In a quartz glass component with a step design on the surface, which is to be refurbished, a contamination layer of a plate-like portion including the eroded area is removed by a grinding process, and its surface is finished to mirror polish. Then, a new plate having almost the same shape as the plate-like portion is manufactured, and the one side of the new plate is finished to mirror polish. The mirror surface of the new plate is contacted with the mirror surface of the existing component. The contact surface is bonded by applying a high pressure to each plate and by heating in a vacuum furnace to a high temperature. (For example, see patent document 3)

However, the conventional method described above has the following problems. The surface deposit on the quartz glass component is removed by using a chemical such as dilute hydrofluoric acid or by a grinding process, and cleaning with a chemical such as dilute hydrofluoric acid is again performed to remove residual impurities before the flame treatment. Thus, the repetitive cleaning damages the surface of the base material, and significantly changes dimension and surface state of the portion in which refurbishment is not originally necessary. Moreover, it is difficult to confirm whether fine deposit remaining in microcracks on the surface of the base material has been totally removed. Thus, quality of the quartz glass component, relative to which the processing treatment is to be performed, is not uniform.

The process of the above-described refurbishment method has the following problem. Entire surfaces of the reaction surface and its opposite side is thickened by flame-welding, so that the base material is breakable due to the effect of thermal stress and strain generated in a wide area.

Moreover, there are the following problems for the refurbishment of the quartz glass component having a step design on the surface. A newly-manufactured part is welded to the whole area of the joint of the existing quartz glass component from which the contaminated portion has been separated, thereby lowering the yield ratio and use efficiency of quartz materials. Further, quartz material is breakable due to the effect of thermal stress and strain generated in the wide area, so that it requires much skill to weld the large area. Thus, such a processing treatment results in the low productivity.

RELATED ART

Patent Document

[Patent Document 1] Japanese Patent No. 4139184
[Patent Document 2] Japanese Published Unexamined Patent Application No. 2005-67997
[Patent Document 3] Japanese Published Unexamined Patent Application No. 2006-232624

SUMMARY OF THE INVENTION

It is an object of the present invention to solve the aforementioned problems and provide a method of refurbishing a quartz glass component, in which the state of a deposit, erosion and deterioration of a quartz glass component that has been used in a certain process of semiconductor manufacturing, for example, is carefully checked before cleaning the quartz glass component, an appropriate cleaning method is determined depending on the contamination status, the quartz glass component is cleaned with minimum damage to a base material, the residual deposit is precisely checked to thereby carefully select the quartz glass component, and a processing of refurbishment is carried out rationally. As a result, the refurbishment method can increase the mechanical strength of the quartz glass component which is made of brittle material, prevent breakage arising from growth of thermal stress and strain during a flame treatment in a refurbishment process, enhance the productivity and the yield ratio through efficient use of raw materials of the quartz glass, stabilize the quality and rationalize the refurbishment.

The present invention provides a method of refurbishing a quartz glass component as a first aspect thereof comprising:

performing a receiving inspection of a contaminated or eroded and deteriorated quartz glass component;

irradiating the quartz glass component with light of a predetermined wavelength to cause a fluorescence effect;

determining a cleaning method of the quartz glass component by inspecting a contamination status from a difference in fluorescent color between the quartz glass component and a surface deposit;

performing a predetermined cleaning process of the quartz glass component to remove the surface deposit depending on the contamination status; and restoring and refurbishing an eroded and deteriorated portion of the cleaned quartz glass component by a flame treatment.

Accordingly, the contamination status of the quartz glass component before cleaning is precisely and rationally checked, thereby selecting the cleaning method depending on the state and carrying out the cleaning rationally.

The present invention provides a method of refurbishing a quartz glass component as a second aspect thereof comprising:

irradiating the cleaned quartz glass component with the light of the predetermined wavelength to cause the fluorescence effect, whereby processability of the flame treatment for the cleaned quartz glass component is determined by inspecting a presence or absence of residual impurities from the difference in fluorescent color between the quartz glass component and the surface deposit.

Accordingly, the residual deposit of the cleaned quartz glass component is precisely and rationally checked, processability of the flame treatment is rationally determined, and the quartz glass component which is to be performed the flame treatment is carefully selected, thereby maintaining the quality of the quartz glass component and rationalizing the processes of refurbishment.

According to a third aspect of the present invention, the quartz glass component before or after the cleaning process is irradiated with ultraviolet light of a wavelength range 200-400 nm. The light has reliable and practical fluorescent properties.

According a fourth aspect of the present invention, the cleaning method of the quartz glass component is selected from a combination of primary and secondary cleaning processes, or from either the primary or the secondary cleaning process depending on the contamination status which is confirmed by the ultraviolet light irradiation. The cleaning can be selected from three types depending on the contamination status, thereby realizing the rational cleaning. For example, when the quartz glass component has been heavily contaminated, the component is cleaned by means of the combination of the primary and secondary cleanings. When the component has been moderately contaminated, the cleaning method is selected from either the primary or the secondary cleaning process. Thus, the cleaning is rationalized.

According to a fifth aspect of the present invention, the primary cleaning process comprises spraying dry ice particles onto the contaminated quartz glass component together with compressed air or nitrogen gas to peel off the surface deposit. Accordingly, the surface deposit is removed by cleaning the quartz glass component with minimum damage to the base material.

According to a sixth aspect of the present invention, the secondary cleaning process comprises heating the contaminated quartz glass component in a high-temperature furnace to sublime or incinerate the surface deposit. Accordingly, the surface deposit is precisely removed with minimum damage to the base material of the quartz glass component.

According to a seventh aspect of the present invention, coloration inside the quartz glass component, that is induced by solarization of a quartz glass material, is removed by the secondary cleaning process. Accordingly, appearance of the quartz glass component is restored and refurbished.

According to an eighth aspect of the present invention, the high-temperature furnace is cooled down to contract and peel off the surface deposit. Accordingly, the surface deposit is rationally removed with minimum damage to the base material of the quartz glass component.

According to a ninth aspect of the present invention, the quartz glass component is a chamber part for use in a plasma treatment apparatus for fabricating a semiconductor or liquid-crystal device. Accordingly, the cleaning and refurbishment are suitable for the quartz glass component, which is expensive and is a brittle material.

The present invention provides a method of refurbishing a quartz glass component as a tenth aspect thereof comprising:

performing a receiving inspection of a contaminated or eroded and deteriorated quartz glass component;

irradiating the quartz glass component, which has undergone the receiving inspection, with light of a predetermined wavelength to cause a fluorescence effect;

performing a predetermined cleaning process of the quartz glass component to remove a surface deposit depending on a contamination status;

irradiating the cleaned quartz glass component with light of the predetermined wavelength to cause the fluorescence effect; and restoring and refurbishing the eroded and deteriorated portion of the cleaned quartz glass component, which has been considered to necessitate that a flame treatment is processable by inspecting a presence or absence of residual deposit through irradiation of light of the predetermined wavelength, through either steps of separating the cleaned quartz glass component into eroded and non-eroded portions depending on a state of erosion and deterioration, and forming an integral structure by welding the non-eroded portion with a new material including a remaining material, where the new material is a substitute for the eroded portion, or a step of flame-treating the cleaned quartz glass component without separating the quartz glass component into the eroded and non-eroded portions.

Accordingly, the quartz glass component is rationally cleaned, and the residual deposit is carefully and rationally checked. In addition, relative to the quartz glass component which has been carefully selected and considered as the flame treatment is processable, it is selected depending on the eroded state whether a step of separating the base material into the eroded and non-eroded portions is included or not. In the case of separating the base material into the eroded and non-eroded portions, the remaining material is utilized as a new material that is a substitute for the eroded portion to be discarded. Therefore the yield ratio of the quartz material, which is expensive, is improved, the refurbishment process is rationalized, and the refurbishment cost is decreased through efficient use.

The present invention provides a method of refurbishing a quartz glass component as an eleventh aspect thereof comprising:

dividing the non-eroded portion, which has been separated from the quartz glass component, into several pieces;

dividing the new material containing the remaining material into several pieces; and forming an integral structure by welding the divided pieces of each portion for refurbishment.

Accordingly, the refurbishment is rationalized, the mechanical strength against thermal stress and strain is increased, the productivity is increased, and the material lasts longer.

The present invention provides a method of refurbishing a quartz glass component as a twelfth aspect thereof comprising:

smoothing surfaces of the divided pieces of the non-eroded portion and the new material by flame treatment; and forming an integral structure by welding the divided pieces for refurbishment.

Accordingly, mechanical strength of the component parts before being subjected to the flame treatment is increased to resist thermal stress and strain due to the flame treatment, and mechanical strength of the quartz glass component, which is a brittle material, is increased.

The present invention provides a method of refurbishing a quartz glass component as a thirteenth aspect thereof comprising:

dividing the quartz glass component in a coexistent state of the eroded and non-eroded portions into several pieces without separating the quartz glass component into the eroded and non-eroded portions;

directly flame-treating an eroded side of the divided piece to increase thickness of the quartz glass component; and forming an integral structure by welding the thickened pieces to each other.

Accordingly, the quartz glass component is easily and promptly processed, and mechanical strength against thermal stress and strain is increased as compared with a conventional refurbishment process in which the eroded and deteriorated portion is grinded and then the opposite side is thickened by welding quartz rods.

According to a fourteenth aspect of the present invention, the eroded portion of the quartz glass component is thickened by directly flame-welding quartz rods without the step of separating the quartz glass component into the eroded and non-eroded portions. Accordingly, the quartz glass component is easily and promptly processed in comparison with a conventional refurbishment process in which the eroded and deteriorated portion is grinded and then the opposite side is thickened by welding quartz rods.

According to a fifteenth aspect of the present invention, the new material containing the remaining material has a ring-like, discoid shape, or has a shape divide therefrom. Accordingly, the remaining materials are used effectively, and the quartz glass component is refurbished rationally and at lower cost.

According to a sixteenth aspect of the present invention, the quartz glass component is a chamber part for use in a plasma treatment apparatus for fabricating a semiconductor or liquid-crystal device. Accordingly, the cleaning and refurbishment are suitable for the quartz glass component, which is expensive and is a brittle material.

TECHNICAL ADVANTAGE OF THE INVENTION

In the first aspect of the present invention, the quartz glass component is irradiated with light of a predetermined wavelength to cause a fluorescence effect, and a cleaning method of the quartz glass component determined by inspecting a contamination status from a difference in fluorescent color between the quartz glass component and the surface deposit. Accordingly, the contamination status of the quartz glass component before cleaning is precisely and rationally checked, so that it is possible to select the cleaning method depending on the state and carry out the cleaning rationally.

In the second aspect of the present invention, the cleaned quartz glass component is irradiated with the light of the predetermined wavelength to cause the fluorescence effect, whereby processability of the flame treatment for the cleaned quartz glass component is determined by inspecting a presence or absence of the residual impurities from the difference in fluorescent color between the quartz glass component and the surface deposit. Accordingly, the residual deposit of the cleaned quartz glass component is precisely and rationally checked, processability of the flame treatment is rationally determined, and the quartz glass component, relative to which the flame treatment is to be performed, is carefully selected, so that it is possible to maintain the quality of the quartz glass component and rationalize the processes of refurbishment.

According to the third aspect of the present invention, the quartz glass component before or after the cleaning process is irradiated with ultraviolet light of a wavelength range 200-400 nm. The light has reliable and practical fluorescent properties. In addition, an appropriate cleaning method can be selected, and a presence or absence of the residual deposit can be reliably confirmed.

According the fourth aspect of the present invention, the cleaning method of the quartz glass component is selected from a combination of primary and secondary cleaning processes, or from either the primary or the secondary cleaning process depending on the contamination status which is confirmed by the ultraviolet light irradiation. The cleaning can be selected from three types depending on the contamination status, thereby realizing the rational cleaning. For example, when the quartz glass component has been heavily contaminated, the component is cleaned by means of the combination of the primary and secondary cleanings. When the member has been moderately contaminated, the cleaning method is selected from either the primary or the secondary cleaning process. Thus, the cleaning is rationalized.

According to the fifth aspect of the present invention, the primary cleaning process comprises spraying dry ice particles onto the contaminated quartz glass component together with compressed air or nitrogen gas to peel off the surface deposit. Accordingly, the surface deposit is removed by cleaning the quartz glass component with minimum damage to the base material.

According to the sixth aspect of the present invention, the secondary cleaning process comprises heating the contaminated quartz glass component in a high-temperature furnace to sublime or incinerate the surface deposit. Accordingly, the surface deposit is precisely removed with minimum damage to the base material of the quartz glass component.

According to the seventh aspect of the present invention, coloration inside the quartz glass component, that is induced by solarization of the quartz glass material, is removed by the secondary cleaning process. Accordingly, appearance of the quartz glass component is restored and refurbished.

According to the eighth aspect of the present invention, the high-temperature furnace is cooled down to contract and peel off the surface deposit. Accordingly, the surface deposit is rationally removed with minimum damage to the base material of the quartz glass component.

According to the ninth aspect of the present invention, the quartz glass component is a chamber part for use in a plasma treatment apparatus for fabricating a semiconductor or liquid-crystal device. Accordingly, the cleaning and refurbishment are suitable for the quartz glass component, which is expensive and is a brittle material.

In the tenth aspect of the present invention, the method of refurbishing the quartz glass component comprises steps of irradiating the cleaned quartz glass component with light of the predetermined wavelength to cause the fluorescence effect; and restoring and refurbishing the eroded and deteriorated portion of the cleaned quartz glass component, which has been considered to necessitate that a flame treatment is processable by inspecting a presence or absence of the residual deposit through irradiation of light of the predetermined wavelength, through either steps of separating the cleaned quartz glass component into eroded and non-eroded portions depending on a state of erosion and the deterioration, and forming an integral structure by welding the non-eroded portion with a new material including a remaining material, where the new material is a substitute for the eroded portion, or a step of flame-treating the cleaned quartz glass component without separating the quartz glass component into the eroded and non-eroded portions. Accordingly, the quartz glass component is rationally cleaned, and the residual deposit is carefully and rationally checked. In addition, relative to the quartz glass component which has been carefully selected and considered as the flame treatment is processable, it is selected depending on the eroded state whether a step of separating the base material into the eroded and non-eroded portions is included or not. In the case of separating the base material into the eroded and non-eroded portions, the remaining material is utilized as a new material that is a substitute for the eroded portion to be discarded. Therefore, the yield ratio of the quartz material, which is expensive, is improved, the refurbishment process is rationalized, and the refurbishment cost is decreased through efficient use.

The present invention provides a method of refurbishing a quartz glass component as the eleventh aspect thereof comprising a step of dividing the non-eroded portion and new material into several pieces, and forming an integral structure by welding the divided pieces of each portion for refurbishment. Accordingly, the refurbishment is rationalized, the mechanical strength against thermal stress and strain is increased, the productivity is increased, and the material lasts longer.

The present invention provides a method of refurbishing a quartz glass component as the twelfth aspect thereof comprising a step of smoothing surfaces of the divided pieces of non-eroded portion and the new material by flame treatment, and forming an integral structure by welding the divided pieces of each portion for refurbishment. Accordingly, mechanical strength of the component parts before being subjected to the flame treatment is increased to resist thermal stress and strain due to the flame treatment, and mechanical strength of the quartz glass component, which is a brittle material, is increased.

The present invention provides a method of refurbishing a quartz glass component as the thirteenth aspect comprising a step of dividing the quartz glass component in a coexistent state of the eroded and non-eroded portions into several pieces without separating the quartz glass component into the eroded and non-eroded portions, directly flame-treating an eroded side of the divided piece to increase in thickness of the quartz glass component, and forming an integral structure by welding the thickened pieces to each other. Accordingly, the quartz glass component is easily and promptly processed, and mechanical strength against thermal stress and strain is increased as compared with a conventional refurbishment process in which the eroded and deteriorated portion is grinded and then the opposite side is thickened.

According to the fourteenth aspect of the present invention, the eroded portion of the quartz glass component is thickened by directly flame-welding quartz rods without the step of separating the quartz glass component into the eroded and non-eroded portions. Accordingly, the quartz glass component is easily and promptly processed in comparison with a conventional refurbishment process in which the eroded and deteriorated portion is grinded and then the opposite side is thickened.

According to the fifteenth aspect of the present invention, the new material containing the remaining material has a ring-like, discoid shape, or has a shape divided therefrom. Accordingly, the remaining materials are used effectively, and the quartz glass component is refurbished rationally and at lower cost.

According to the sixteenth aspect of the present invention, the quartz glass component is a chamber part for use in a plasma treatment apparatus for fabricating a semiconductor or liquid-crystal device. Accordingly, the cleaning and refurbishment are suitable for the quartz glass component, which is expensive and is a brittle material.

BRIEF DESCRIPTION OF THE DRAWINGS

FIG. 3 shows refurbishment steps of an outline of the first embodiment. FIG. 3(a) is a perspective view of the contaminated and deteriorated quartz glass component that has not been subjected to the refurbishment process. FIG. 3(b) is a perspective view of the non-eroded portion (outer ring) in which the eroded portion of the quartz glass component has been cut. FIG. 3(c) is a perspective view of a new inner ring that is a substitute for the eroded portion. FIG. 3(d) is a perspective view showing a state in which the outer ring is divided into parts. FIG. 3(e) is a perspective view showing a state in which the new inner ring is divided into parts. FIG. 3(f) is a perspective view showing a state of chamfering of the divided parts of the inner and outer rings. FIG. 3(g) is a perspective view showing a state in which the divided parts of the inner and outer rings in pairs are welded to each other. FIG. 3(h) is a perspective view of a refurbished prototype ring completed by welding four pairs of the divided parts of the inner and outer rings.

FIG. 8 is a view of refurbishment steps that shows an outline of the second embodiment.

FIG. 13 is a view of refurbishment steps that shows an outline of the third embodiment. FIG. 13(a) is a perspective view of the contaminated and deteriorated quartz glass component before being subjected to the refurbishment process. FIG. 13(b) is a perspective view showing a state in which a part of the eroded and deteriorated portion has been thickened. FIG. 13(c) is a perspective view of a refurbished prototype ring completed by thickening the whole area of the eroded and deteriorated portion.

DETAILED DESCRIPTION OF THE INVENTION

Figure 1A:
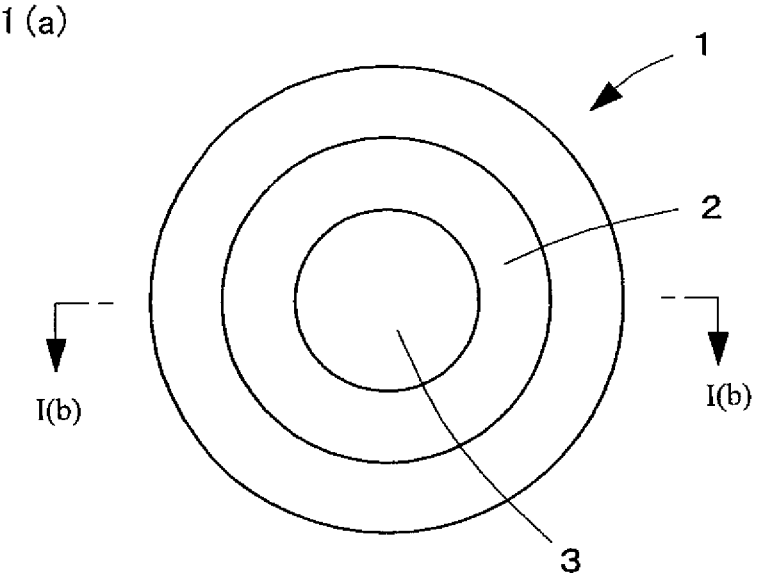
FIG. 1(a) is a plan view of the eroded and deteriorated quartz glass component to which a first embodiment of the present invention is applied.

The following is a description of illustrated embodiments that this invention is applied to refurbishment of the quartz glass component, which is a chamber part in a plasma treatment apparatus for fabricating a semiconductor or liquid-crystal device. In FIG. 1 to FIG. 6, reference numeral 1 is the quartz glass component with step design on the surface, which is to be refurbished, having been eroded and deteriorated due to a long period of use in the plasma treatment apparatus. A large-diameter step 2 is formed on the opposite side of a reaction surface 1a, which is to be subjected to a plasma environment, and a through-hole 3 is formed at the center thereof.

The eroded and deteriorated portion 4 of the quartz glass component 1 in the embodiment can be restored and refurbished. When the eroded and deteriorated portion 4 is eroded out and unusable, the portion is discarded after separating from the base material and a new quartz glass material as substitute for the portion is integrally welded for refurbishment.

The present invention is applicable to a ring-like component (FIG. 16) or a discoid component (FIG. 17), which will be described later, in addition to the quartz glass component 1 having the step design.

Substantially the whole area of the reaction surface 1a is eroded and deteriorated in the plasma environment and the deposit 5 remains at the eroded and deteriorated portion 4 and the inner surface of the through-hole 3.

In a case of a plasma etching treatment apparatus of a silicon oxide film formed on a semiconductor wafer, for example, the deposit 5 consists of organic matters including fluorine.

When the quartz glass component 1 is exposed to the plasma environment over a long time, the base material may become tinged with purple by solarization. The coloration is simultaneously removed by high-temperature heat cleaning, which will be described later.

The solarization is a coloration phenomenon caused by a small amount of metal impurities contained in the quartz glass material and is not removed by normal chemical cleaning since it is not an object attached onto the surface.

The experiment conducted by the inventors demonstrates that the coloration is removed by maintaining the base material of the quartz glass component at a predetermined temperature or higher.

Figure 1B:
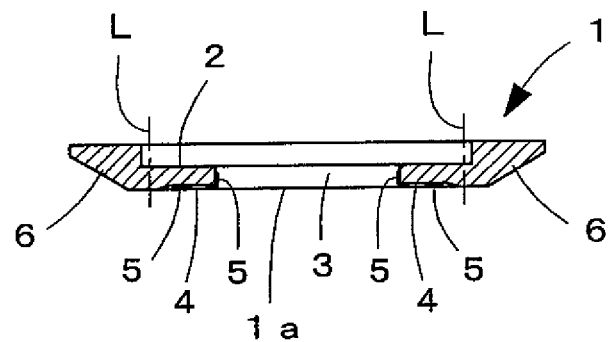
FIG. 1(b) is a cross sectional view taken along line I(b)-I(b) in FIG. 1(a).

In FIG. 1, reference numeral 6 represents a tapered surface formed on one side of the periphery of the quartz glass component 1. Reference symbol L represents a section line provided at the outer side of the eroded and deteriorated portion 4. The quartz glass component 1 is cut along the section line L, the inner portion of the quartz glass component 1 which includes the cut, eroded and deteriorated portion 4 is discarded, and the outer portion which does not include the eroded and deteriorated portion 4 is reutilized.

Figure 2:
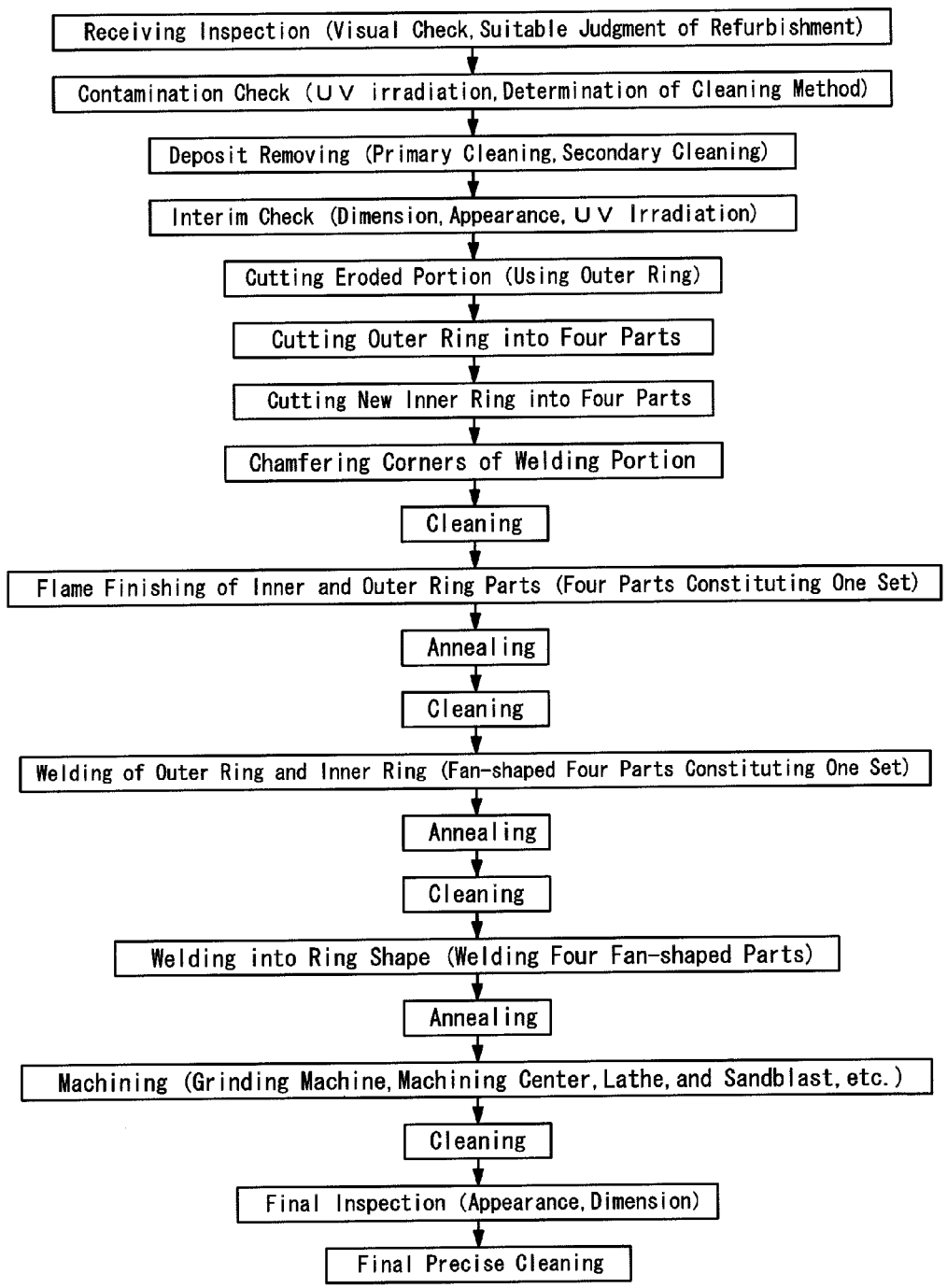
FIG. 2 shows a refurbishment process flowchart of the first embodiment.
Figure 4:
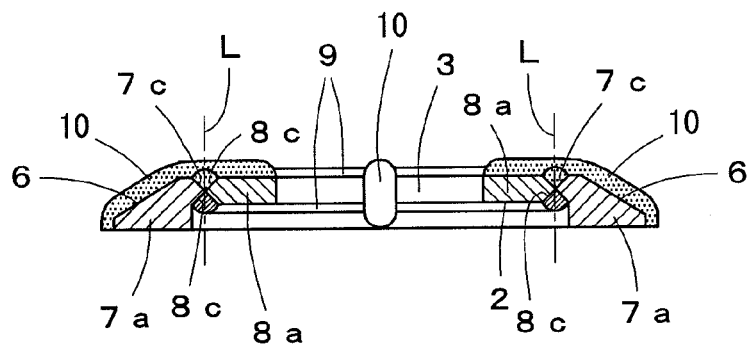
FIG. 4 is an enlarged sectional view taken along line IV-IV in FIG. 3(h).
Figure 5:
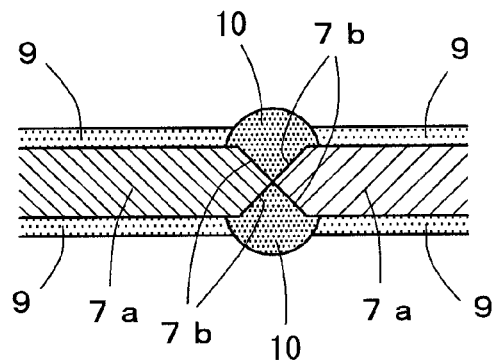
FIG. 5 is an enlarged sectional view taken along line V-V in FIG. 3(h).
Figure 6:
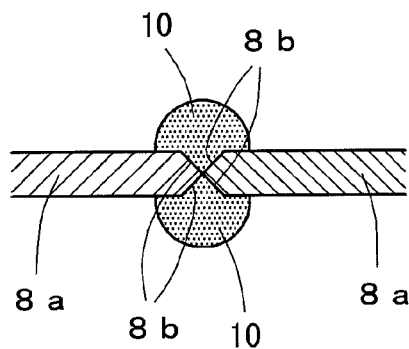
FIG. 6 is an enlarged sectional view taken along line VI-VI in FIG. 3(h).

The refurbishment process of the quartz glass component 1 is shown in FIG. 2. Firstly, the quartz glass component 1, which needs to be refurbished, is inspected when it is received. Then, the quartz glass component is visually checked with respect to the deposit 5, contamination, deterioration, and coloration state due to solarization to determine the processability of refurbishment.

After the receiving inspection, the quartz glass component 1 is irradiated with ultraviolet light having a fluorescence effect, for example, and having a wavelength of from 200 to 400 nm by using a non-destructive test apparatus (not shown). The range of the contamination, which is unable to recognize under the visible light such as white light, is checked from the difference in fluorescence between the quartz glass component 1 and the deposit 5.

More specifically, when ultraviolet light having a wavelength of 254 nm is irradiated, a natural quartz glass fluoresces blue. When ultraviolet light having a wavelength of 365 nm is irradiated, organic matters, which are main components of the deposit 5, fluoresce yellow, red, and green. By checking these colors visually, the existence of the deposit can be judged precisely and rationally.

After checking the deposit, when the quartz glass component is heavily contaminated due to the attachment of a large amount of the deposit, for example, the quartz glass component is cleaned by means of combination of the primary and secondary cleaning methods. When the quartz glass component is moderately contaminated due to the attachment of a small amount of the deposit, the quartz glass component is cleaned by means of the primary or secondary cleaning method.

In the embodiment, dry ice blast cleaning is adopted as the primary cleaning and high-temperature heat cleaning is adopted as the secondary cleaning.

In the dry ice blast cleaning, the quartz glass component 1 is placed into a clean chamber (not shown), and the high-purity dry ice particles, which have temperatures of minus 70 degrees Celsius or lower, are sprayed onto the quartz glass component 1 together with compressed clean air or nitrogen gas through a blast machine (not shown).

In the embodiment, the injection pressure of the dry ice blasting is set to be from 0.2 to 0.5 MPa.

Then, the surface of the quartz glass component 1 is cooled by the dry ice blasting. When the dry ice particles vaporize, the deposit 5 is peeled off by heat contraction, whereby the deposit 5 is removed without damaging the quartz glass component 1.

In the high-temperature heat cleaning, the quartz glass component 1, which has been subjected to the primary cleaning or which has been omitted the primary cleaning, is placed into the high-temperature cleaning furnace (not shown). The high-temperature cleaning furnace is heated to temperatures of about 700 to 1050 degrees Celsius in air, vacuum, or inert gas atmosphere to sublime or incinerate the tiny deposit 5 or the contamination. The purplish coloration of the quartz glass component 1 due to solarization is removed simultaneously.

The solarization is a coloration phenomenon caused by a small amount of metal impurities contained in the base material of the quartz glass component and is not removed by normal chemical cleaning since it is not an object attached onto the surface.

The experiment conducted by the inventors demonstrates that the coloration is removed by maintaining the base material of the quartz glass component at-least 600 degrees Celsius or higher.

Accordingly, when the quartz glass component 1 on which the deposit 5 remains and which is colored due to solarization is cleaned by heating, the temperature is raised until the coloration is removed, that is 700 degrees Celsius or higher, which is 600 degrees Celsius plus something extra, whereby both the deposit and the coloration can be removed rationally.

In this case, organic matters constituting the deposit 5 are oxidized at temperatures of about 400 degrees Celsius or higher, and solarization is removed at temperatures of about 700 degrees Celsius or higher. The lower limit of the temperature in the high-temperature cleaning furnace is set to 700 degrees Celsius. On the other hand, a strain point of quartz glass material is around 1100 degrees Celsius, so that the upper limit of the temperature in the high-temperature cleaning furnace is set to 1050 degrees Celsius to prevent thermal deformation of the base material.

In the cool-down process of the high-temperature heat cleaning, the deposit 5 is peeled off by a difference of coefficients of thermal expansion of the deposit 5 and the quartz glass component 1.

In this case, in addition to the so-called dry cleaning, it is possible to adopt a wet cleaning that the quartz glass component 1 is immersed in a chemical such as acid, alkali, and an organic solvent. Further, the quartz glass component may be cleaned by means of a combination of the dry and wet cleaning processes.

The dimension and appearance of the quartz glass component 1, in which the deposit 5 and the coloration due to solarization have been removed in the described manner, is visually checked in an interim check. The quartz glass component 1 is irradiated with ultraviolet light having a wavelength of from 200 to 400 nm by using the non-destructive test apparatus (not shown). Thus, the presence or absence of the residual of the deposit 5, that is the result of the cleaning, is visually checked precisely and rationally from the difference in fluorescent color between the quartz glass component 1 and the deposit 5. Further, the contamination area which is invisible at optical wavelengths can be assessed by the above manner.

The quartz glass component 1 is considered as being refurbished when the deposit 5 remains in a predetermined amount or less. The quality and productivity are improved by selecting the refurbishable quartz glass component 1 carefully, and refurbishment processing is carried out rationally.

In this case, when the quartz glass component 1 is moderately eroded and the later-described refurbishment process is considered unnecessary after performing the receiving inspection or the interim check for the quartz glass component 1, the eroded and deteriorated portion 4 is restored and refurbished by a series of the cleaning steps to remove the deposit 5 and/or the coloration due to solarization. After this, the refurbishment treatment is finished by means of mechanical processing when necessary.

On the other hand, after the receiving inspection or the interim check, when the eroded and deteriorated portion 4 of the quartz glass component 1 needs to be restored or refurbished, the after-mentioned refurbishment process is performed.

In the refurbishment process, various kinds of refurbishment processes are adopted based on the shape and dimension of the quartz glass component 1, the state of the eroded and deteriorated portion 4, the operating conditions of the refurbishment processing, processing time, and cost.

As described above, the eroded and deteriorated portion 4 of the quartz glass component 1 in the embodiment is severely eroded and is unable to use. Thus, a refurbishment method is adopted in which the eroded and deteriorated portion 4 is discarded, and a new quartz glass material is integrated by welding for recovery.

The following outlines the refurbishment process. After separating the eroded and deteriorated portion and the non-eroded portion, the eroded and deteriorated portion is replaced with a new material. Then, the non-eroded portion and the new material are integrated by flame-welding. This state is shown in FIG. 3.

In the refurbishment process, firstly, the quartz glass component 1 is cut along the section line L by appropriate means. A deteriorated portion that is inside of the section line L and includes the eroded and deteriorated portion 4 is discarded, and the non-eroded portion that is outside of the section line L is reutilized. The outer ring 7 in the embodiment has an outside diameter of 400 mm and an inside diameter of about 350 mm.

Then, the outer ring 7 is divided into pieces by appropriate means.

The number of pieces is determined on the basis of the after-mentioned flame treatment, operating conditions, and the size of the outer ring 7. For example, a ring having similar shape and size to the one used in the embodiment is divided into four pieces. A ring smaller than the one used in the embodiment is divided into two to three pieces and a ring larger than the same is divided into four pieces or more.

In FIG. 3, reference numeral 7a represents a piece of the divided outer ring 7.

A new inner ring 8 is prepared as a substitute for the eroded and deteriorated portion 4 which is to be discarded. The inner ring 8 is divided in the same number as the outer ring 7.

The inner ring 8 has substantially the same diameter as the section line L. The ring is made of a plate and the thickness thereof is determined by considering the machining allowance. The center of the plate is formed with a hole that is smaller than the aforementioned through-hole 3.

In this case, as described above, a new quartz glass material may be used for the inner ring 8. However, when manufacturing the new quartz glass material, a remaining material of quartz glass having a shape of a ring, disc, or plate, or another remaining material of quartz glass divided therefrom is generated. Thus, by using the remaining material of quartz glass for the inner ring 8 or an inner ring piece, which will be described later, the refurbishment can be carried out rationally and the refurbishment cost is reduced. Accordingly, the remaining material of quartz glass needs to have similar purity to the new remaining material of quartz glass and may be formed at any time.

The inner ring 8 is divided into pieces in the same number as the outer ring 7. The inner ring piece 8a is formed through dividing the inner ring 8 into four equal parts.

Then, the surfaces of the joined and welded portions of the outer and inner ring pieces 7a, 8a are chamfered with appropriate means to be tapered.

In FIG. 3, reference numeral 7b represents a tapered chamfered-portion formed on both ends of the outer ring piece 7a. Reference numeral 7c represents a tapered chamfered-portion formed on the inner surface of the outer ring piece 7a. Reference numeral 8b represents a tapered chamfered-portion formed on both ends of the inner ring piece 8a. Reference numeral 8c represents a tapered chamfered-portion formed on the outer surface of the inner ring piece 8a. This state is shown in FIG. 3(f).

Then, the outer ring piece 7a and the inner ring piece 8a are cleaned with hydrofluoric acid and de-ionized water. After flame finishing them, internal strain is removed by annealing.

The ring pieces are flame finished with an oxygen-hydrogen flame burner (not shown). Forming a flame at the nozzle exist, the flame is applied to the outer ring piece 7a and the inner ring piece 8a and heated to about 2000 degrees Celsius. Microcracks are melted to smoothen these surfaces. After enhancing mechanical strength, they are placed in an electric furnace for annealing to remove internal strain.

The outer and inner ring pieces 7a, 8a in pairs are arranged, the outer ring 7a being arranged externally of the inner ring 8a. They are jointed to each other by welding quartz glass rods (not shown) in welding spaces, which are generally V-shaped grooves formed by the facing chamfered portions 7c, 8c, This state is shown in FIG. 3(g), and the outer and the inner ring pieces 7a, 8a are formed in a generally fan-shape.

The ring pieces are welded with the oxygen-hydrogen flame burner (not shown). Forming a flame having a temperature of about 2000 degrees Celsius, the flame is applied to quartz glass rod, and the melted quartz glass is filled in a welding space. In FIG. 3, reference numeral 9 represents a welding bead in which the melted quartz glass is solidified.

Then, other pairs of the outer and inner ring pieces 7a, 8a are welded in the similar manner, four pairs of the ring pieces 7a, 8a are welded in total. After welding, the outer ring piece 7a and inner ring piece 8a are placed in an electric furnace for annealing to remove strain. After removing strain, the ring pieces are cleaned with hydrofluoric acid and de-ionized water.

The edges of the welded four pairs of the outer and inner ring pieces 7a, 8a are arranged in a ring shape. They are welded to each other by melting quartz rods, as previously described, in welding spaces which are the generally V-shape grooves formed by the facing chamfered portions 7b, 7b and 8b, 8b, respectively. In FIG. 3, reference numeral 10 represents a welding bead for welding the end faces of the outer and the inner ring pieces 7a, 8a. The welding bead 10 is wider and higher than the aforementioned welding bead 9.

This state is shown in FIG. 3(h). A refurbished prototype ring is completed as a consequence of connecting four pairs of the outer and inner ring pieces 7a, 8a in a ring shape.

Then, the refurbished prototype ring is placed in an electric furnace to remove strain by annealing. After this, refurbishment process is to be moved from the hot process focusing on the flame treatment to machining process forming the ring into a predetermined shape, size, and surface roughness.

In the machining process, by using a grinding machine, machining center, lathe, and sandblast, the thickness, inside and outside diameters, and tapered surface of the refurbished ring are machined to form the ring into a predetermined shape, size, and surface roughness. Then, the machining process of the refurbished ring is finished.

Then, after the refurbished ring is cleaned, the appearance and the dimension are checked in a final inspection. A series of refurbishment processes are completed after the final cleaning.

As described above, in the refurbishment process, the refurbished prototype ring is formed by separating the quartz glass component 1 into the eroded portion and the non-portion, replacing the eroded portion with the new quartz glass material which includes a remaining material, dividing the non-eroded portion and the new material into parts when refurbishing the quartz glass component by subjecting them to the flame treatment and welding them, welding and annealing a pair of the divided parts, and arranging a plurality of pairs in a ring-shape and welding these integrally.

Accordingly, the method can reduce thermal stress and strain of the non-eroded portion and the new material, prevent generation of a crack when welding them or using a refurbished material, facilitate refurbishment and flame treatment, and enhance productivity as compared with a method in which the non-eroded portion and the new material, which are not divided, are welded together after subjecting them to flame treatment.

The refurbishment process facilitates rational use of various remaining materials having a ring-like or discoid shape as the new material, further having a divided shape of them, and thereby can improve the yield ratio of the quartz glass component 1, reduce the refurbishment cost and improve the productivity.

On the other hand, the above-described refurbishment process is suitable for quartz glass material, which is a brittle material, dividing the non-eroded portion and the new material into parts and welding them to disperse remaining small internal stress and strain, preventing growth of internal stress and strain and generation of a crack, and increasing mechanical strength.

FIG. 7 to FIG. 17 show other embodiments of the present invention. The components and the parts corresponding to the aforementioned structures are denoted by the same reference numerals.

Of these figures, FIG. 7 to FIG. 11 show main points of the second embodiment of the present invention. In the embodiment, the quartz glass component 1 can be used if mended because the eroded and deteriorated portion 4 is not so heavily deteriorated as to be discarded, unlike the aforementioned one which is unable to be refurbished.

Figure 7:
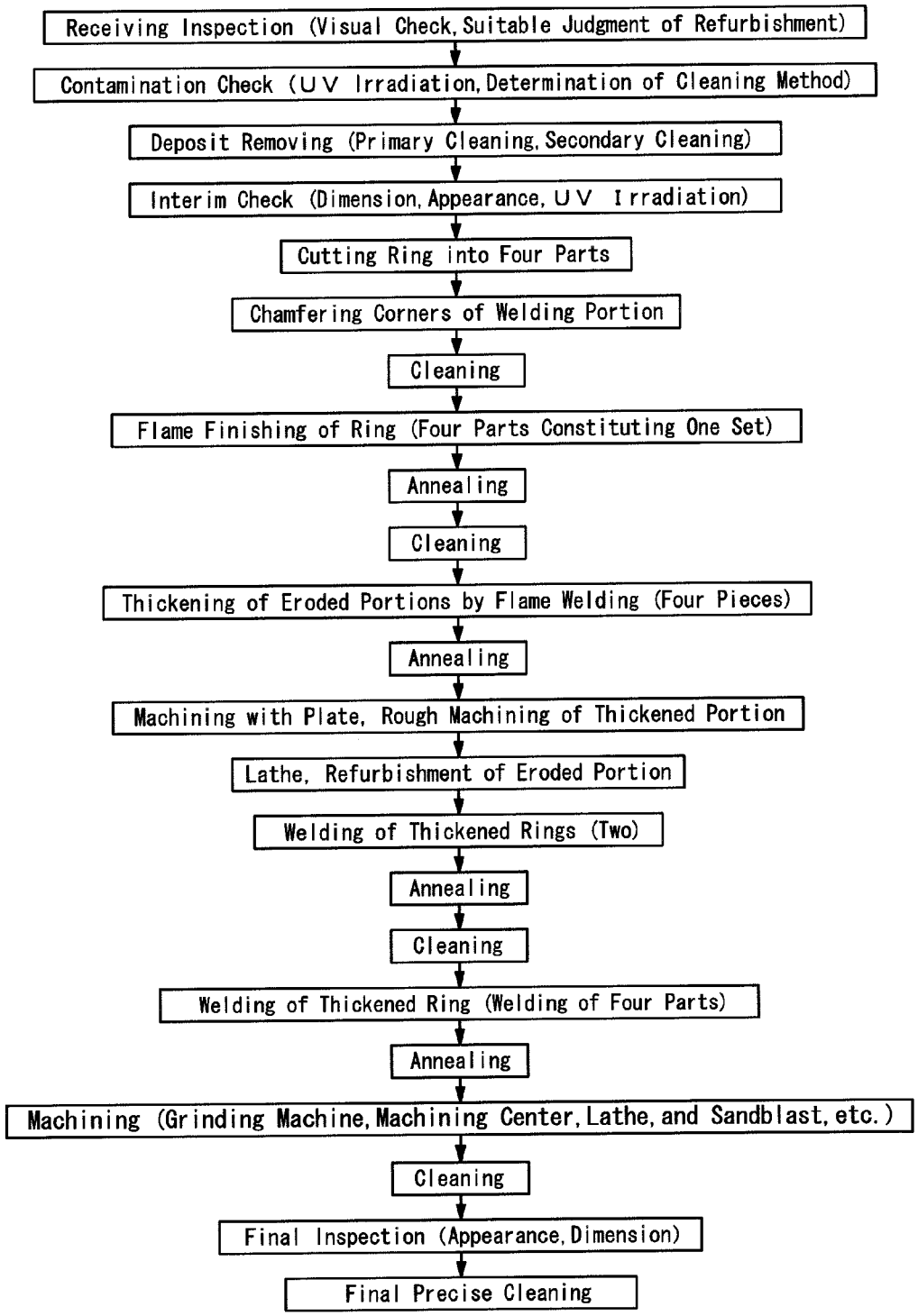
FIG. 7 shows a refurbishment process flowchart of the second embodiment of the present invention.

The refurbishment process for the quartz glass component 1 is shown in FIG. 7. The receiving inspection before subjecting the quartz glass component to the refurbishment process, the contamination check, how to remove the deposit, and the interim check are performed in the same manner as the aforementioned embodiment. Only the flame treatment in the refurbishment process is performed differently and the outline of the flame treatment is shown in FIG. 8.

Specifically, the second embodiment is applied to the quartz glass component 1, which is similar to the embodiment as described above, having a step design on the surface. The quartz glass component 1, which has been carefully selected in the receiving inspection and the interim check, is divided radially into parts with appropriate means.

Accordingly, unlike the first embodiment, the eroded and deteriorated portion 4 does not need to be cut in a round shape along the section line L. The shape of the quartz glass component 1 is not limited to the ring with the step design, and a ring or disc without the step design, which will be described later, is also adoptable.

The quartz glass component 1 is divided in the same manner as in the aforementioned embodiment. The ends of the joined or welded portion of the divided part 1b are tapered by chamfering. After cleaning them with hydrofluoric acid and de-ionized water, they are flame-finished. Further, internal strain is removed by annealing. The divided part 1b is flame-finished in the same manner as in the embodiment previously described and mechanical strength is enhanced.

Figure 8A:
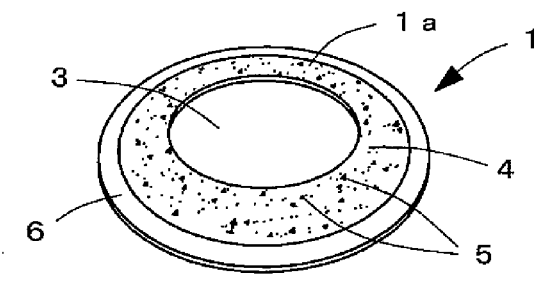
FIG. 8(a) is a perspective view of the contaminated and deteriorated quartz glass component before being subjected to the refurbishment process.
Figure 8B:
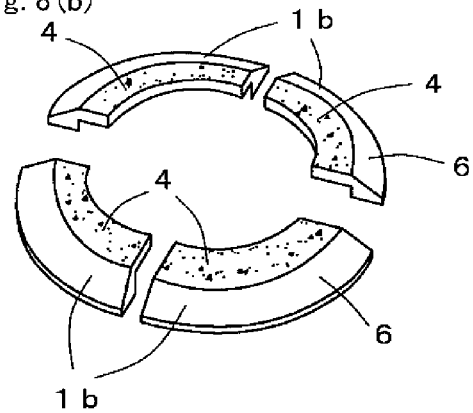
FIG. 8(b) is a perspective view showing a state in which the quartz glass component having the eroded and non-eroded portions in coexistence has been cut.
Figure 8C:
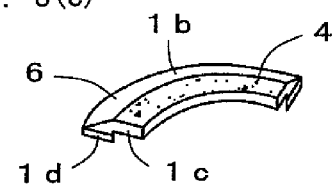
FIG. 8(c) is a perspective view showing a state of chamfering of the divided part.
Figure 8D:
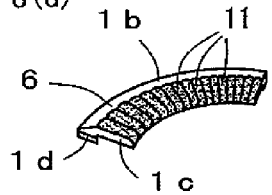
FIG. 8(d) is a perspective view showing a state in which the eroded portion of the divided part has been thickened.
Figure 9:
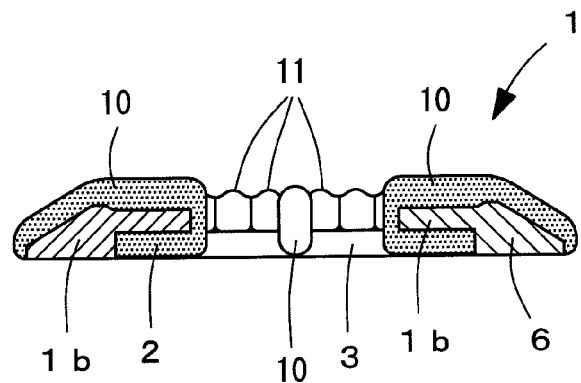
FIG. 9 is an enlarged sectional view taken along line IX-IX in FIG. 8(e).
Figure 10:
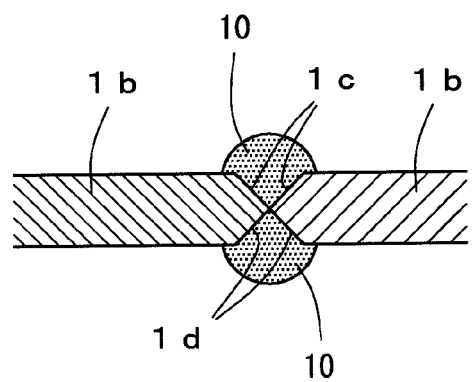
FIG. 10 is an enlarged sectional view taken along line X-X in FIG. 8(e).
Figure 11:
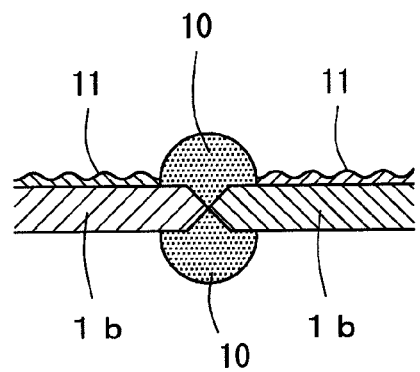
FIG. 11 is an enlarged sectional view taken along line XI-XI in FIG. 8(e).
Figure 12:
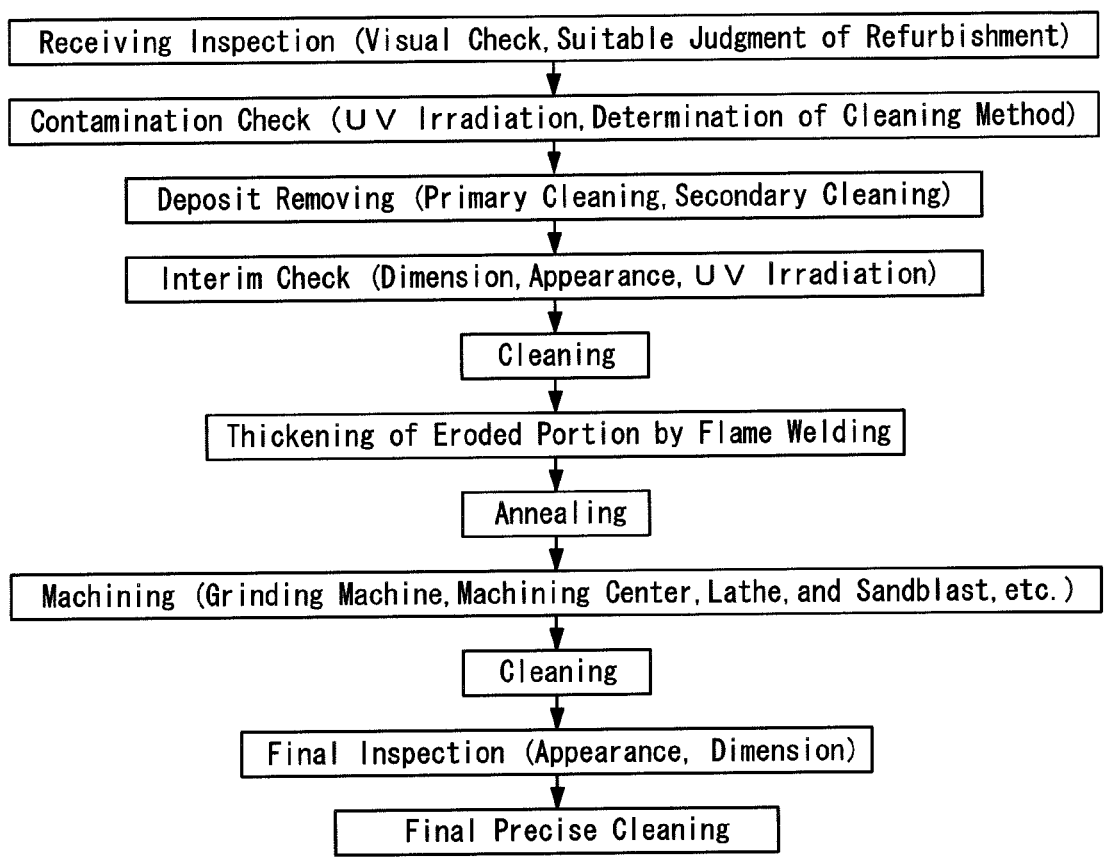
FIG. 12 shows a refurbishment process flowchart of the third embodiment of the present invention.
Figure 14:
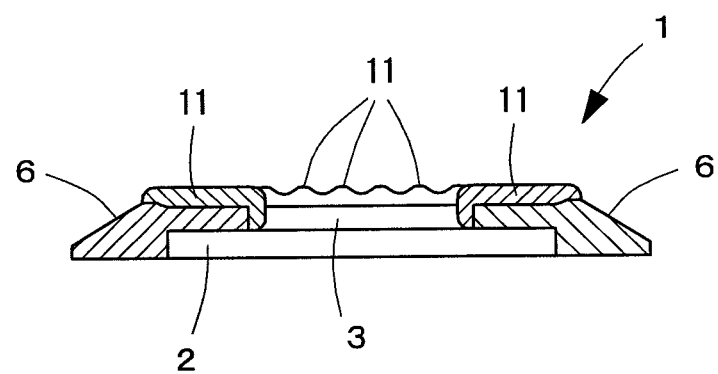
FIG. 14 is an enlarged sectional view taken along line XIV-XIV in FIG. 13(c).
Figure 15:
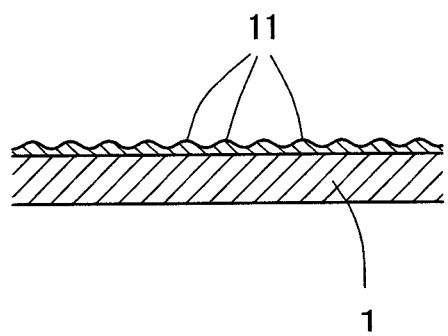
FIG. 15 is an enlarged sectional view taken along line XV-XV in FIG. 13(c).

Next, the eroded and deteriorated portion 4 of the divided part 1b that has been annealed is thickened with an oxygen-hydrogen flame burner (not shown). The flame at the nozzle exit of the burner having a temperature of about 2000 degrees Celsius is applied to the quartz glass rod and the melted quartz glass is used to thicken the eroded and deteriorated portion 4. The inner surface of the eroded through-hole 3 is thickened. This state is shown in FIG. 8(d) and FIG. 9.

In the embodiment, the melted quartz glass is formed like a bead in a radial direction into the quartz glass thickened portion 11, the other divided parts 1b are thickened in the same manner, the four divided parts 1b are thickened in the same thickness, and the inner surface of the through-hole 3 is formed with the thickened portion 11. Then, they are placed in an electric furnace for annealing to remove strain. After removing strain, they are cleaned with hydrofluoric acid and de-ionized water.

Then, the thickened four divided parts 1b are arranged in a ring shape. They are welded to each other by melting quartz glass, as previously described, in a generally V-shaped welding space formed by the facing chamfered portions 1c, 1c and 1d, 1d, respectively.

Figure 8E:
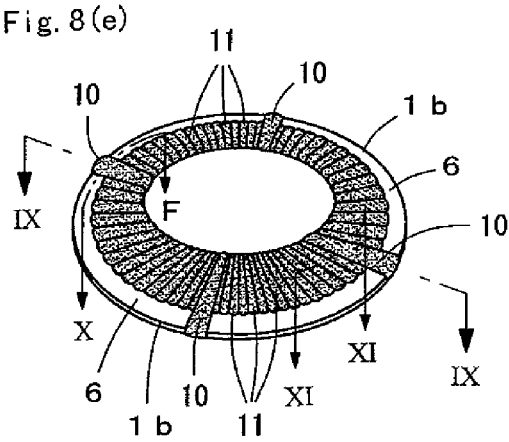
FIG. 8(e) is a perspective view of a refurbished prototype ring completed by welding four pairs of the thickened divided parts.

This state is shown in FIG. 8(e). A refurbished prototype ring is completed as a consequence of welding the four divided parts 1b in a ring shape.

As described above, in the refurbishment process in the second embodiment, the quartz glass component 1 is divided and the eroded and deteriorated portion of the divided part 1b is thickened by directly flame-welding for refurbishment without separating the quartz glass component 1 into the eroded portion and the non-eroded portion and without substituting the eroded portion with a new material.

Accordingly, the operations in the first embodiment, such as those of cutting along the eroded and deteriorated portion 4, procurement of the inner ring 8, which is a new material, dividing of the outer and inner rings 7, 8, chamfering of the outer and inner ring pieces 7a, 8a, and welding are omitted. Thus, the operations can be easily and rationally performed and the productivity will be increased.

In the refurbishment process of the second embodiment, the eroded and deteriorated portion of the divided part 1b is thickened by directly flame-welding. Thus, this reduces labor of grinding and the parts are thickened easily and promptly as compared with a conventional complicated method that includes the steps of removing the eroded portion by grinding and thickening the opposite surface of the grinded surface.

Moreover, compared with the conventional method in which the whole area of one surface of the quartz glass component is thickened, this method prevents concentration of thermal stress and strain by thickening each of the divided parts 1b. This method also has advantage that the refurbishment and flame treatment is made easier and productivity is enhanced because generation of a crack during welding work is prevented.

The above-described refurbishment process is suitable for refurbishing the quartz glass component 1, which is a brittle material, dividing and welding the non-eroded portion, dispersing remaining small internal stress and strain and reducing them, preventing growth of internal stress and strain and generation of a crack, and thereby improving mechanical strength.

FIGS. 12 to 15 show main points of the third embodiment. This embodiment corresponds to an applied embodiment of the aforementioned second embodiment.

This embodiment is applied, in the same manner as previously described, to the quartz glass component 1 having a step design on the surface. The eroded and deteriorated portion 4 is directly thickened and the inner surface of the through-hole 3 is thickened without dividing the quartz glass component 1 into pieces, which has been carefully selected in the receiving inspection. Accordingly, chamfering, flame finishing, and welding of the divided parts are unnecessary.

The quartz glass component is thickened in the same manner as in the second embodiment. A refurbished prototype ring is completed without need of annealing each of the thickened portions.

Accordingly, in the refurbishment process of the third embodiment, the quartz glass component 1 which has been carefully selected in the receiving inspection can be promptly thickened without dividing the quartz glass component 1. Thus, the quartz glass component can be easily and rationally refurbished and productivity will be enhanced.

Figure 16A:
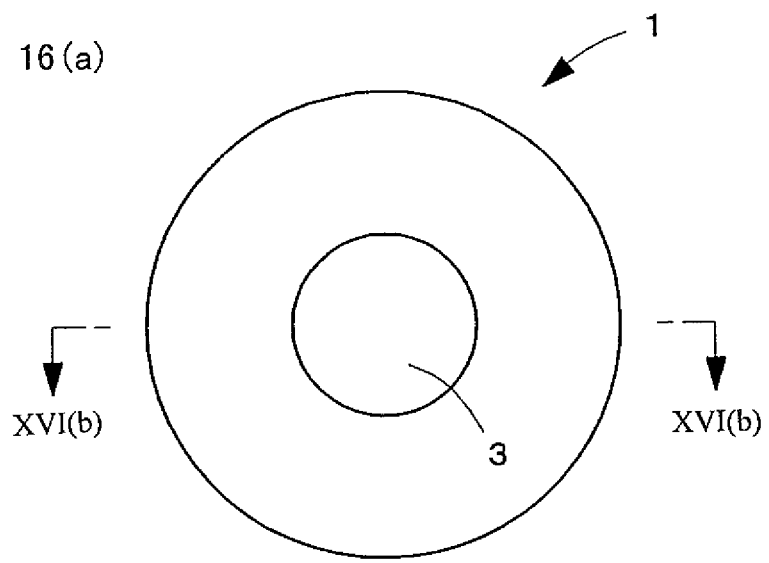
FIG. 16(a) is a plan view of a ring-like component of the fourth embodiment of the present invention.
Figure 16B:
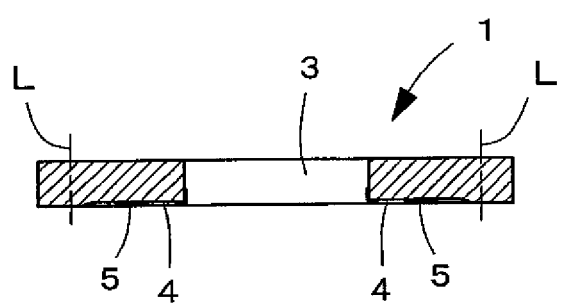
FIG. 16(b) is a sectional view taken along line XVI(b)-XVI(b) in FIG. 16(a).
Figure 17A:
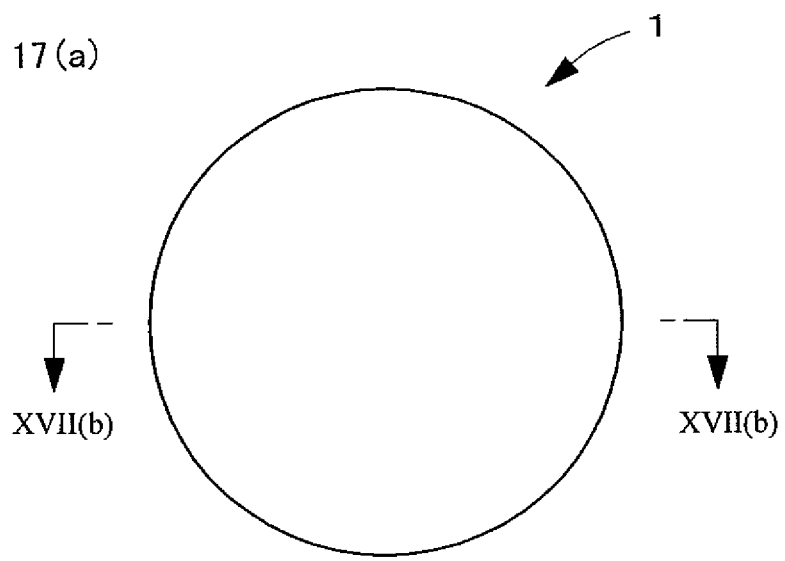
FIG. 17(a) is a plan view of a discoid component of the fourth embodiment of the present invention.
Figure 17B:
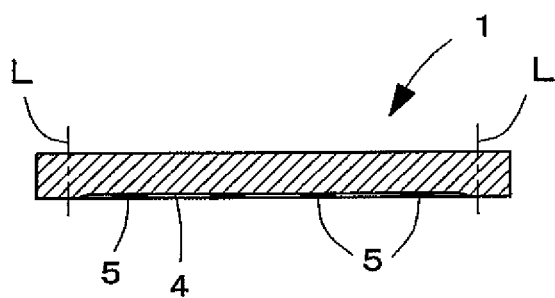
FIG. 17(b) is a sectional view taken along line XVII(b)-XVII(b) of the FIG. 17(a).

FIGS. 16-17 show main points of the fourth embodiment. This embodiment is applied to the ring-shaped quartz glass component 1 in FIG. 16 and to the discoid quartz glass component 1 in FIG. 17 instead of the quartz glass component 1 having a step design on the surface. The concrete process of refurbishment is similar to the aforementioned embodiment.

As discussed above, in the method of refurbishing a quartz glass component, in which the state of a deposit, erosion and deterioration of a quartz glass component that has been spent by using in a certain process of semiconductor manufacturing, for example, is carefully checked before cleaning the quartz glass component, the appropriate cleaning method is determined depending on the contamination status, the quartz glass component is cleaned with minimum damage to a base material, the residual deposit is precisely checked to thereby carefully select the quartz glass component and carry out refurbishment rationally. As a result, the refurbishment method can increase the mechanical strength of the quartz glass component which is a brittle material, prevent breakage arising from growth of strain and thermal stress during a flame treatment in a refurbishment process, enhance the productivity and the yield ratio through efficient use of the quartz glass material, stabilize the quality and rationalize the refurbishment.

The invention claimed is:

1. A method of refurbishing a quartz glass component in an eroded or contaminated and deteriorated state, comprising:
   inspecting an eroded or contaminated and deteriorated quartz glass component by irradiating same with ultraviolet light of a wavelength of 200-380 nm to cause a fluorescence effect;
   determining an erosion or contamination status through visual inspection of differences in fluorescing colors visible upon irradiation of the eroded or contaminated and deteriorated quartz glass component, the colors being attributable to surface deposit on the eroded or contaminated and deteriorated quartz glass component and to the quartz glass of the eroded or contaminated and deteriorated quartz glass component;
   performing a predetermined cleaning method on the eroded or contaminated and deteriorated quartz glass component based on the erosion or contamination status, the predetermined cleaning method being a primary cleaning method that is a dry ice blast cleaning comprising peeling off the surface deposit by spraying dry ice particles onto the eroded or contaminated and deteriorated quartz glass component together with compressed air or compressed nitrogen gas and utilizing thermal contraction to effect removal of the surface deposit;

whereby, after performing the predetermined cleaning method, a cleaned quartz glass component is obtained;

checking the erosion or contamination status of the cleaned quartz glass component by irradiating the cleaned quartz glass component with ultraviolet light and visually inspecting the cleaned quartz glass component; and performing a post-cleaning treatment selected from a removal and replacement treatment in which a portion of the cleaned quartz glass component is removed and replaced with a replacement portion of new quartz glass material and a flame treatment without the removal and replacement treatment, wherein the post-cleaning treatment is a removal and replacement treatment comprising the steps of separating the cleaned quartz glass component into an eroded portion and a non-eroded portion, discarding the eroded portion, substituting the eroded portion with a replacement portion of new quartz glass material, dividing the non-eroded portion separated from the quartz glass component into divided pieces of the non-eroded portion, dividing the new quartz glass material into divided pieces of the new quartz glass material, forming parts by welding the divided pieces of the non-eroded portion and the divided pieces of the new quartz glass material, and welding the parts to form an integral structure.

2. The method according to claim 1, wherein the post-cleaning treatment is a removal and replacement treatment comprising the steps of providing a number of replacement portions of new quartz glass material that are equal to a number of divided pieces of the non-eroded portion and pairing the portions of new quartz glass material and divided non-eroded portions, whereby pairs are formed;

welding surfaces of the pairs to form parts: and welding the parts to form an integral structure for refurbishment.

3. The method according to claim 2, wherein the new quartz glass material has a ring shape, discoid shape, or polygonal shape, or has a shape divided therefrom.

4. The method according to claim 1, wherein the new quartz glass material includes new quartz glass material remaining after manufacturing other quartz glass components from new quartz glass material.

5. The method according to claim 1, wherein the eroded or contaminated and deteriorated quartz glass component is a chamber part for use in a plasma treatment apparatus for fabricating a semiconductor or liquid-crystal device.

6. The method according to claim 1, wherein the quartz glass component is step-, ring-, or disc-shaped.

7. The method according to claim 1, wherein the new quartz glass material has a ring shape, discoid shape, or polygonal shape, or has a shape divided therefrom.

8. The method according to claim 1, further comprising the step of smoothing surfaces of the divided pieces of the non-eroded portion and the divided pieces of the new quartz glass material by a flame treatment prior to forming parts by welding.

9. A method of refurbishing a quartz glass component in an eroded or contaminated and deteriorated state, comprising:

inspecting an eroded or contaminated and deteriorated quartz glass component by irradiating same with ultraviolet light of a wavelength of 200-380 nm to cause a fluorescence effect;

determining an erosion or contamination status through visual inspection of differences in fluorescing colors visible upon irradiation of the eroded or contaminated and deteriorated quartz glass component, the colors being attributable to surface deposit on the eroded or contaminated and deteriorated quartz glass component and to the quartz glass of the eroded or contaminated and deteriorated quartz glass component;

performing a predetermined cleaning method on the eroded or contaminated and deteriorated quartz glass component, the predetermined cleaning method comprising a primary cleaning method followed by a secondary cleaning method, the primary cleaning method being a dry ice blast cleaning comprising peeling off the surface deposit by spraying dry ice particles onto the eroded or contaminated and deteriorated quartz glass component together with compressed air or compressed nitrogen gas and utilizing thermal contraction to effect removal of the surface deposit, the secondary cleaning method being a high temperature heat cleaning comprising sublimating or incinerating the surface deposit by placing the eroded or contaminated and deteriorated quartz glass component in a high-temperature furnace and heating the quartz glass component to a temperature in a range of about 700° C. to a maximum temperature of 1050° C., the range being sufficient to remove the surface deposit and the range being below a strain point of quartz glass;

whereby, after performing the predetermined cleaning method, a cleaned quartz glass component is obtained;

checking the erosion or contamination status of the cleaned quartz glass component by irradiating the cleaned quartz glass component with ultraviolet light and visually inspecting the cleaned quartz glass component; and performing a post-cleaning treatment selected from a removal and replacement treatment in which a portion of the cleaned quartz glass component is removed and replaced with a replacement portion of new quartz glass material and a flame treatment without the removal and replacement treatment.

10. The method of claim 9, wherein the post-cleaning treatment is a flame treatment comprising the steps of flame treating the cleaned quartz glass component, whereby the cleaned quartz glass component is refurbished.

11. The method according to claim 9, wherein the post-cleaning treatment is a flame treatment comprising the steps of:

carrying out a flame treatment on an eroded portion of the cleaned quartz glass component without separating the eroded portion from the non-eroded portion of the cleaned quartz glass component, whereby the eroded portion is thickened and refurbished by using a material that is the same as the material of the eroded portion.

12. The method of claim 9 wherein the post-cleaning treatment is a removal and replacement treatment comprising the steps of separating the cleaned quartz glass component into an eroded portion and a non-eroded portion, discarding the eroded portion, substituting the eroded portion with a replacement portion of new quartz glass material, dividing the non-eroded portion separated from the quartz glass component into divided pieces of the non-eroded portion, dividing the new quartz glass material into divided pieces of the new quartz glass material, forming parts by welding the divided pieces of the non-eroded portion and the divided pieces of the new quartz glass material, and welding the parts to form an integral structure.

13. The method according to claim 9, wherein the post-cleaning treatment is a removal and replacement treatment comprising the steps of providing a number of replacement portions of new quartz glass material that are equal to a number of divided pieces of the non-eroded portion and pairing the portions of new quartz glass material and divided non-eroded portions, whereby pairs are formed;

welding surfaces of the pairs to form parts: and welding the parts to form an integral structure for refurbishment.

14. The method according to claim 13, wherein the new quartz glass material includes new quartz glass material remaining after manufacturing other quartz glass components from new quartz glass material.

15. The method according to claim 14, wherein the new quartz glass material has a ring shape, discoid shape, or polygonal shape, or has a shape divided therefrom.

16. The method according to claim 13, wherein the new quartz glass material has a ring shape, discoid shape, or polygonal shape, or has a shape divided therefrom.

17. The method of claim 13 further comprising the step of smoothing surfaces of the divided pieces of the non-eroded portion and the divided pieces of the new quartz glass material by a flame treatment prior to forming parts by welding.

18. The method according to claim 9, wherein the post-cleaning treatment is a flame treatment comprising the steps of:

dividing the cleaned quartz glass component into pieces having an eroded portion and a non-eroded portion;

carrying out a flame treatment on the eroded portion of the quartz glass component, whereby the eroded portion is thickened by using the same material as the material of the eroded portion; and welding surfaces of the pieces together to form an integral structure.

19. The method according to claim 9, wherein the eroded or contaminated and deteriorated quartz glass component is a chamber part for use in a plasma treatment apparatus for fabricating a semiconductor or liquid-crystal device.

20. The method according to claim 9, wherein the quartz glass component is step-, ring-, or disc-shaped.

* * * * *